United States Patent [19]
Kurby

[11] Patent Number: 5,963,846
[45] Date of Patent: Oct. 5, 1999

[54] METHOD AND SYSTEM FOR REPEATING PAGES

[75] Inventor: Christopher Neil Kurby, Elmhurst, Ill.

[73] Assignee: Motorola, Inc., Schaumburg, Ill.

[21] Appl. No.: 08/829,298

[22] Filed: Mar. 31, 1997

[51] Int. Cl.[6] .................................................... H04B 7/14
[52] U.S. Cl. ........................ 455/12.1; 455/13.1; 455/20; 455/458
[58] Field of Search ................................ 455/11.1, 12.1, 455/13.1, 13.2, 428, 458, 20, 31.1, 38.1

[56] References Cited

U.S. PATENT DOCUMENTS

| | | | |
|---|---|---|---|
| 3,742,498 | 6/1973 | Dunn ....................................... | 455/13.2 |
| 4,713,809 | 12/1987 | Mizota ..................................... | 370/97 |
| 4,742,514 | 5/1988 | Goode et al. ........................... | 370/109 |
| 4,972,455 | 11/1990 | Phillips et al. ........................... | 379/59 |
| 5,095,538 | 3/1992 | Durboraw, III ......................... | 455/71 |
| 5,233,626 | 8/1993 | Ames ..................................... | 455/12.1 |
| 5,396,643 | 3/1995 | Frenzer et al. ......................... | 455/13.1 |
| 5,603,079 | 2/1997 | Olds et al. ............................... | 455/13.1 |
| 5,613,193 | 3/1997 | Ishikawa et al. ....................... | 455/12.1 |
| 5,628,049 | 5/1997 | Suemitsu ................................ | 455/11.1 |
| 5,628,050 | 5/1997 | McGraw et al. ....................... | 455/12.1 |
| 5,781,540 | 7/1998 | Malcolm et al. ....................... | 370/321 |
| 5,802,469 | 9/1998 | Nounin et al. ......................... | 455/422 |
| 5,812,086 | 9/1998 | Bertiger et al. ........................ | 342/357 |

*Primary Examiner*—Reinhard J. Eisenzopf
*Assistant Examiner*—Duc Nguyen
*Attorney, Agent, or Firm*—Gregory J. Gorrie

[57] ABSTRACT

A paging repeater (22) receives (152) a paging signal (30) transmitted (138) by a low-earth orbit satellite (24) while compensating (150) for Doppler effects, modifying (156) the paging signal (30) to produce a repeat signal (40), and transmitting (166) the repeat signal shifted in both the time and frequency domains so as to preclude the generation of interference. A pager (28) receives a paging signal (30) directly from the satellite (24) while compensating (108) for Doppler effects whenever the pager (28) is unshadowed with regard to the satellite (24), or receiving a repeat signal (40) from a paging repeater (22) whenever the pager (28) is shadowed with regard to the satellite (24).

20 Claims, 6 Drawing Sheets

… … …

METHOD AND SYSTEM FOR REPEATING PAGES

FIELD OF THE INVENTION

The current invention relates to paging communication systems. More specifically, the current invention relates to paging communication systems utilizing multi-channel simplex paging signals and associated paging repeaters.

BACKGROUND OF THE INVENTION

In paging communication systems considerable difficulty is encountered because of "shadowing." A paging signal is normally a simplex signal transmitted by a paging system transmitter at a uhf or microwave frequency. Since, at the frequencies involved, signal propagation is essentially line-of-sight with limited penetration, paging signal reception is often impeded or prohibited in the signal shadows caused by buildings, tunnels, hills, and other artificial and natural topographical features. For example, in an exemplary satellite communication system, paging signals are limited by a 27 dB link margin. This link margin is only adequate for limited building penetration. A pager within a medium-sized or larger building may have to be close to an outside wall in order to receive a page.

In traditional communications, the standard solution to the general problem of reception in a shadowed area is to provide a repeater. A repeater, in elementary form, is a receiver connected to a transmitter. Through an unshadowed receiving antenna, a repeater receives the original signal then retransmits it through a transmitting antenna positioned to cover the shadowed area. The retransmitted signal is typically shifted in time or frequency from the original signal, thereby increasing spectrum requirements in the vicinity of the repeater.

A paging repeater would be a repeater specifically engineered to provide this function for a paging communication system. Thus, a pager in an otherwise shadowed location might be able to receive a signal from a paging repeater when an adequate signal could not be received directly from a paging system transmitter.

A satellite-based paging communication system that utilizes low-earth-orbit (LEO) satellites exacerbates the spectrum-increase problem. A given paging signal received from a such a satellite may be extensively shifted in frequency relative to the satellite's transmission frequency due to the Doppler effect. In an exemplary paging system transmitting in the L-band, the Doppler shift may be in excess of ±37 KHz. When receiving an exemplary paging signal only a little over 40 KHz wide, a center-frequency shift of ±37 KHz may prevent a pager from obtaining an adequate lock on the signal, impeding reception.

Were a conventional repeater to be used to repeat a paging signal containing a significant Doppler shift, retransmission of that signal would represent a significant waste of bandwidth and further complicate the problems inherent in the reception of such a signal. For example, around 240 KHz of spectrum would be required to convey a 40 KHz paging signal through a repeater.

Accordingly, a need exists for a paging system that incorporates paging repeaters on a non-interfering basis so as to compensate for paging signal shadowing wherever required without passing on unnecessary Doppler shifts in the signals being repeated. Simultaneously, the proper reception of Doppler-shifted paging signals from low-earth-orbit satellite transmitters should be allowed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
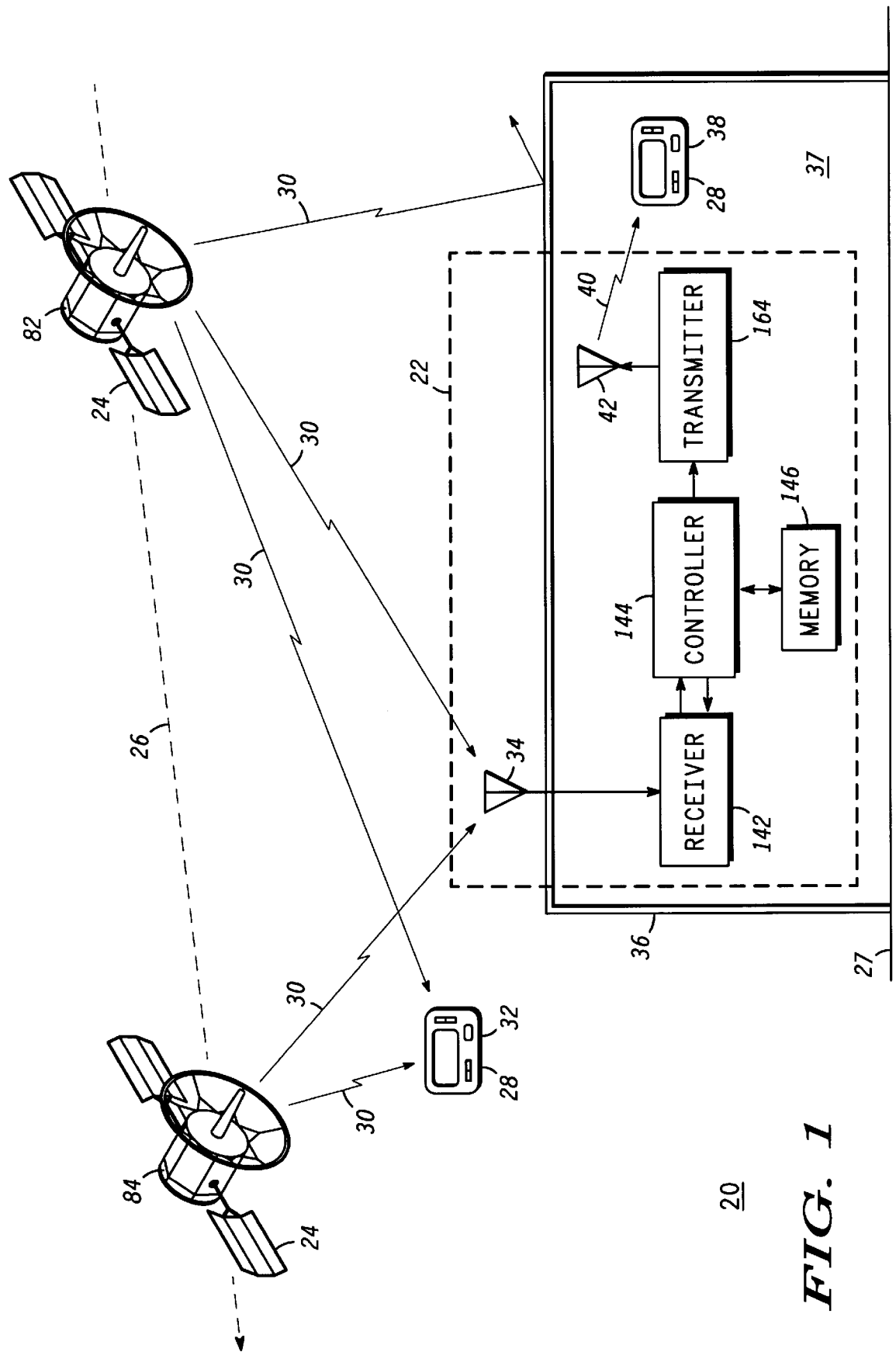
FIG. 1 depicts a schematic representation of a satellite paging communication system incorporating an inbuilding repeater in accordance with a preferred embodiment of the present invention.

FIG. 1 depicts a schematic representation of a satellite paging communication system 20 incorporating an inbuilding paging repeater 22 in accordance with a preferred embodiment of the present invention. System 20 includes satellites 24 placed in orbits 26 around a celestial body, hereinafter referred to as earth 27. Specifically, system 20 includes satellites 24 placed in low-earth orbits 26 (only one of which is shown) using conventional technology, repeaters 22, and pagers 28. Simplex paging signals 30 are transmitted by satellites 24, and may be received by an unshadowed pager 32 or an unshadowed receiving antenna 34 for repeater 22. However, since paging signal 30 cannot significantly penetrate building 36, shadowed pager 38 located within the interior volume 37 of building 36 cannot receive signal 30. Therefore, repeater 22 receives paging signal 30 at receiving antenna 34 and retransmits signal 30 as repeater signal 40 at an in-shadow transmitting antenna 42. Shadowed pager 38 may then receive repeater signal 40.

Those skilled in the art will readily appreciate that while exemplary system 20 utilizes an inbuilding repeater 22 to compensate for inbuilding shadowing, a similar approach may be used wherever shadowing is a problem, as in tunnels, ships, aircraft, city-street canyons, mountainous terrain, natural canyons, etc.

Figure 2:
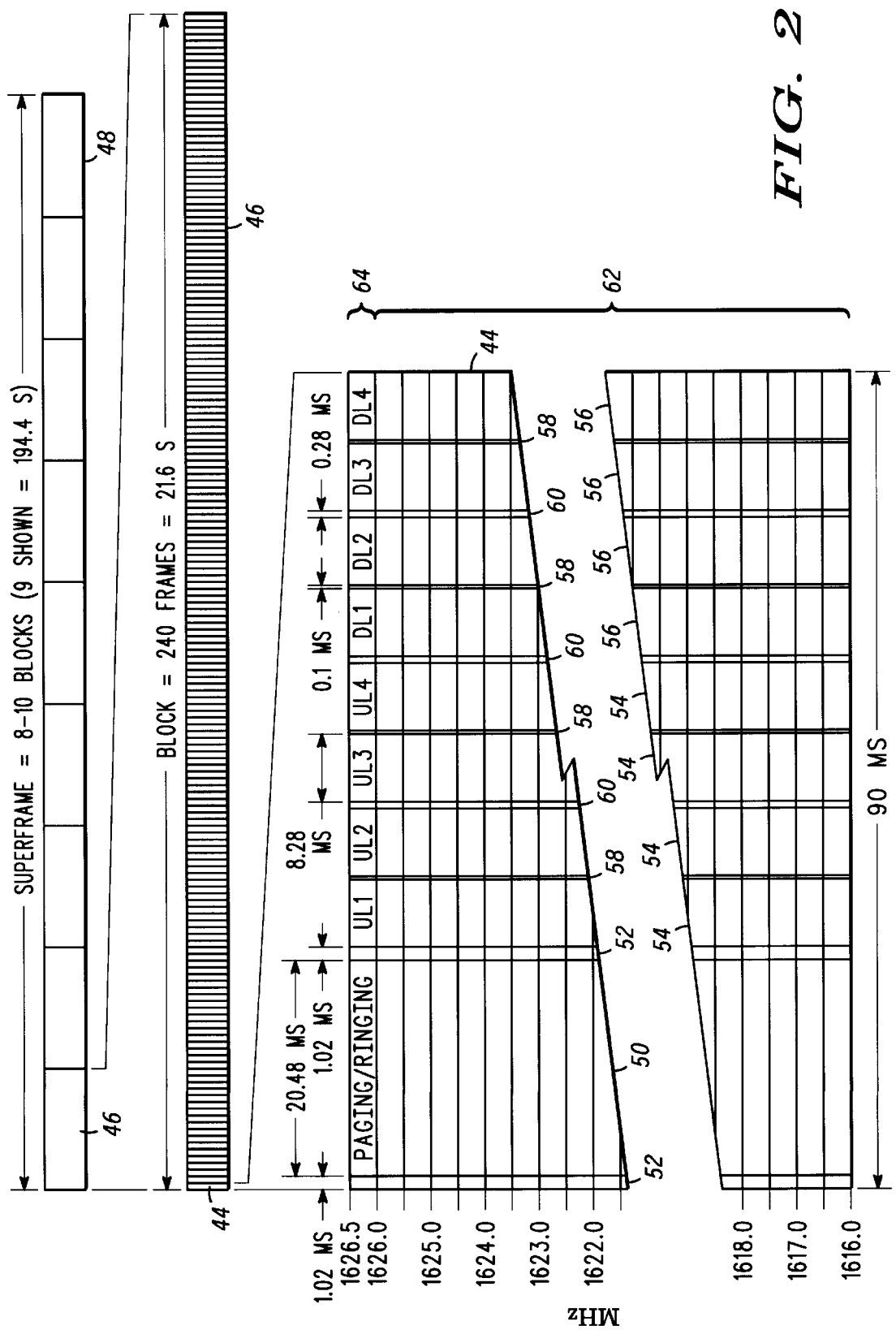
FIG. 2 depicts an exemplary L-band duplex data frame, group, and superframe incorporating a simplex paging/ringing signal in accordance with a preferred embodiment of the present invention.

FIG. 2 depicts an exemplary L-band simplex/duplex data frame 44, block 46, and superframe 48 incorporating a simplex paging/ringing signal 30 in accordance with a preferred embodiment of the present invention. For system 20, exemplary frame 44 encompasses 90 milliseconds in the time domain. Exemplary frame 44 includes a 20.48 millisecond simplex paging/ringing downlink time 50 bracketed by two 1.02 millisecond guard times 52. Simplex downlink time 50 is followed by four 8.28 millisecond traffic uplink times 54 and four 8.28 millisecond traffic downlink times 56, delineated by four 0.10 millisecond guard times 58 and three 0.28 millisecond guard times 60. In this exemplary scheme, paging is conducted only during simplex downlink time 50, or 20.48 milliseconds out of every 90 milliseconds.

In system 20 the above delineations are in the time domain only. In the frequency domain, exemplary frame 44 is delineated as a duplex frequency domain 62 from 1616.0–1626.0 MHz and a simplex frequency domain 64 from 1626.0–1626.5 MHz. Paging occurs only within simplex frequency domain 64.

Frames 44 are grouped into blocks 46, each containing 240 frames 44 in the above-discussed exemplary situation. As each frame may contain one or two paging messages (discussed below), there may be as many as 480 paging messages in a given block 46. Since each frame 44 encompasses 90 milliseconds, block 46 encompasses 21.6 seconds.

Blocks 46 are repeated eight to ten times and grouped into superframes 48, encompassing 172.8–216.0 seconds. An exemplary superframe 48 of nine blocks 46, encompassing 194.4 seconds, is depicted.

In system 20 for a preferred embodiment, a pager 28 would be programmed to be active no more than 21.6 seconds out of every 194.4 seconds, or for no more than one block 46 out of every superframe 48. This 9:1 ratio allows pager 28 to conserve power but still not miss an incoming paging message.

Those skilled in the art will appreciate that the signal schema used in exemplary system 20 is but one of a legion of possible schemata capable of fulfilling the same basic requirements of a paging communication system.

Figure 3:
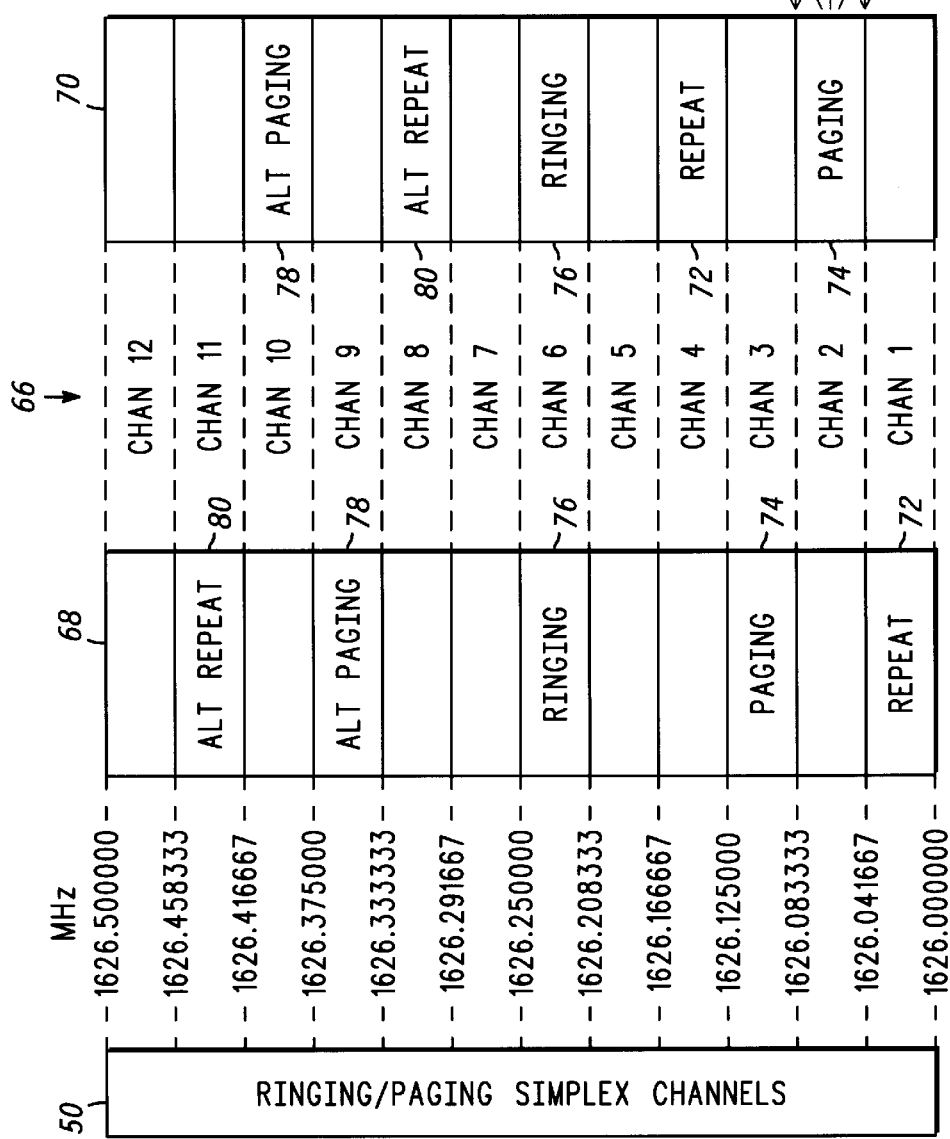
FIG. 3 depicts paging channel allocation schemes incorporating multiple paging and repeater channels in accordance with a preferred embodiment of the present invention.

FIG. 3 depicts paging channel allocation schemes incorporating multiple paging and repeater channels in accordance with a preferred embodiment of the present invention. Exemplary system 20 incorporates twelve channels 66, each 41⅔ KHz wide, within 500 KHz simplex frequency domain 64. Channels 66 are allocated within simplex frequency domain 64 according to a channel allocation scheme, two of which, 68 and 70, are introduced as examples.

Scheme 68 exemplifies a first embodiment of a channel allocation scheme. In scheme 68, a first one of channels 66 (chan 1) is a repeat channel 72, the third channel 66 (chan 3) is a paging channel 74, the sixth channel 66 (chan 6) is a ringing channel 76, the ninth channel 66 (chan 9) is an alternate paging channel 78, and the eleventh channel 66 (chan 11) is an alternate repeat channel 80.

Scheme 70 exemplifies a second embodiment of a channel allocation scheme. In scheme 70, the second channel 66 (chan 2) is paging channel 74, the fourth channel 66 (chan 4) is repeat channel 72, the sixth channel 66 (chan 6) is ringing channel 76, the eighth channel 66 (chan 8) is alternate repeat channel 80, and the tenth channel 66 (chan 10) is alternate paging channel 78.

Those skilled in the art may appreciate that schemes 68 and 70 are but two of the many possible schemes utilizing twelve channels 66, and may also appreciate that schemes utilizing other numbers of channels may readily be adopted.

As shown in FIG. 1, satellites 24 transmit paging signals 30 to pagers 28 and repeaters 22 while in low-earth orbits 26. The constraints of low-earth orbits 26 dictate that satellites 24 have a velocity of approximately 25,000 kph relative to the surface of the earth 27. Due to the Doppler effect, a pager 28 or repeater 22 receiving a signal 30 from a converging near-horizon satellite 82 in an overhead orbit 26 will find that signal 30 to be shifted upward in frequency by as much as 37.5 KHz. Similarly, a signal from a diverging near-horizon satellite 84 in the same orbit 26 will be found to be shifted downward in frequency by a similar amount.

The effect of this Doppler shift may be seen in FIG. 3. Paging channel 74 of channel allocation scheme 70 is assumed to contain an exemplary paging message 86. If paging message 86 is transmitted from a satellite 24 with no motion relative to pager 28 or repeater 22, paging message 86 will be received without a Doppler shift, i.e. in a 41⅔ KHz channel 88 centered on 1626.0625 MHz. If, however, paging message 86 is transmitted by converging near-horizon satellite 82, then paging message 86 will shifted upward in frequency by as much as 37.5 KHz, effectively being contained in a 41⅔ KHz channel 90 centered on approximately 1626.1000 MHz. Similarly, if paging message 86 is transmitted by diverging near-horizon satellite 84, then paging message 86 will shifted downward in frequency by as much as 37.5 KHz, effectively being contained in a 41⅔ KHz channel 92 centered on approximately 1626.0250 MHz.

Figure 4:
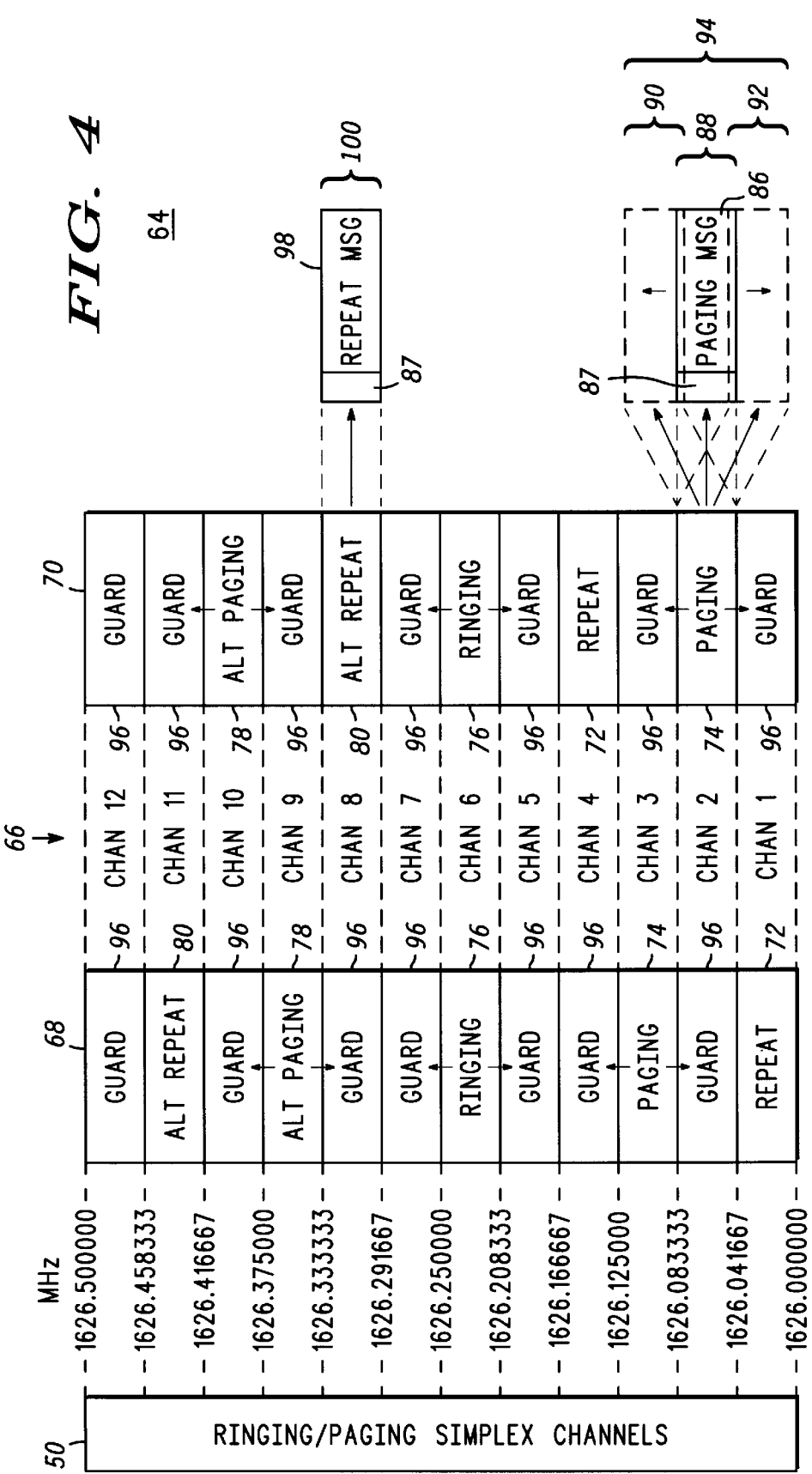
FIG. 4 depicts paging channel allocation schemes with Doppler guard channels in accordance with a preferred embodiment of the present invention.

FIG. 4 depicts paging channel allocation schemes 68 and 70 with Doppler guard channels in accordance with a preferred embodiment of the present invention. In order to receive paging message 86 with a potential Doppler shift of up to ±37.5 KHz, pager 28 and repeater 22 must have a pager message reception bandwidth 94 of 116⅔ KHz centered on the center frequency of the original channel, 1626.0625 MHz for paging channel 74 in exemplary channel allocation scheme 70.

With a pager message reception bandwidth 94 of 116⅔ KHz, pager 28 and repeater 22 may receive paging message 86 without interference only if paging channel 74, the second channel 66 in channel allocation scheme 70, has no information being carried by either adjacent channel 66. The first channel 66 and the third channel 66 are both unused. This is accomplish by bracketing paging channel 74 with unused Doppler guard channels 96 whose function is to provide "space" into which paging channel 74 may move if Doppler shifted. This channel-bracketing is extended to alternate paging channel 78 and ringing channel 76.

However, repeat channel 72 and secondary repeat channel 80 do not require bracketing Doppler guard channels 96. For example, channel allocation scheme 68 has repeat channel 72 in the first channel 66, with no guarantee that frequencies immediately below 1626.0000 MHz will by devoid of signal.

In system 20 (FIG. 1), satellite 24 transmits paging signal 30 with repeat channels 72 and 80 unused. Repeater 22, upon reception of paging signal 30, retransmits signal 30 as repeater signal 40. Repeater signal 40 differs from paging signal 30 in that in repeater signal 40 repeat channels 72 and 80 contain repeated versions of the payload content of paging channels 74 and 78, respectively.

Since repeater 22 (FIG. 1) is essentially stationary relative to shadowed pager 38, repeater signal 40, unlike paging signal 30, is not subject to significant Doppler shift. This is illustrated in FIG. 4 where alternate repeat channel 80, the eighth channel 66 of channel allocation scheme 70, contains an exemplary repeat message 98. Repeat message 98 has no significant Doppler shift and is fully contained in a 41⅔ KHz paging channel 66 centered on 1626.3125 KHz. Hence, shadowed pager 38 need only have a repeat message reception bandwidth 100 of 41⅔ KHz. This is in contrast to unshadowed pager 32, which should have a pager message reception bandwidth 94 of 116⅔ KHz in order to receive potentially Doppler shifted paging message 86.

Figure 5:
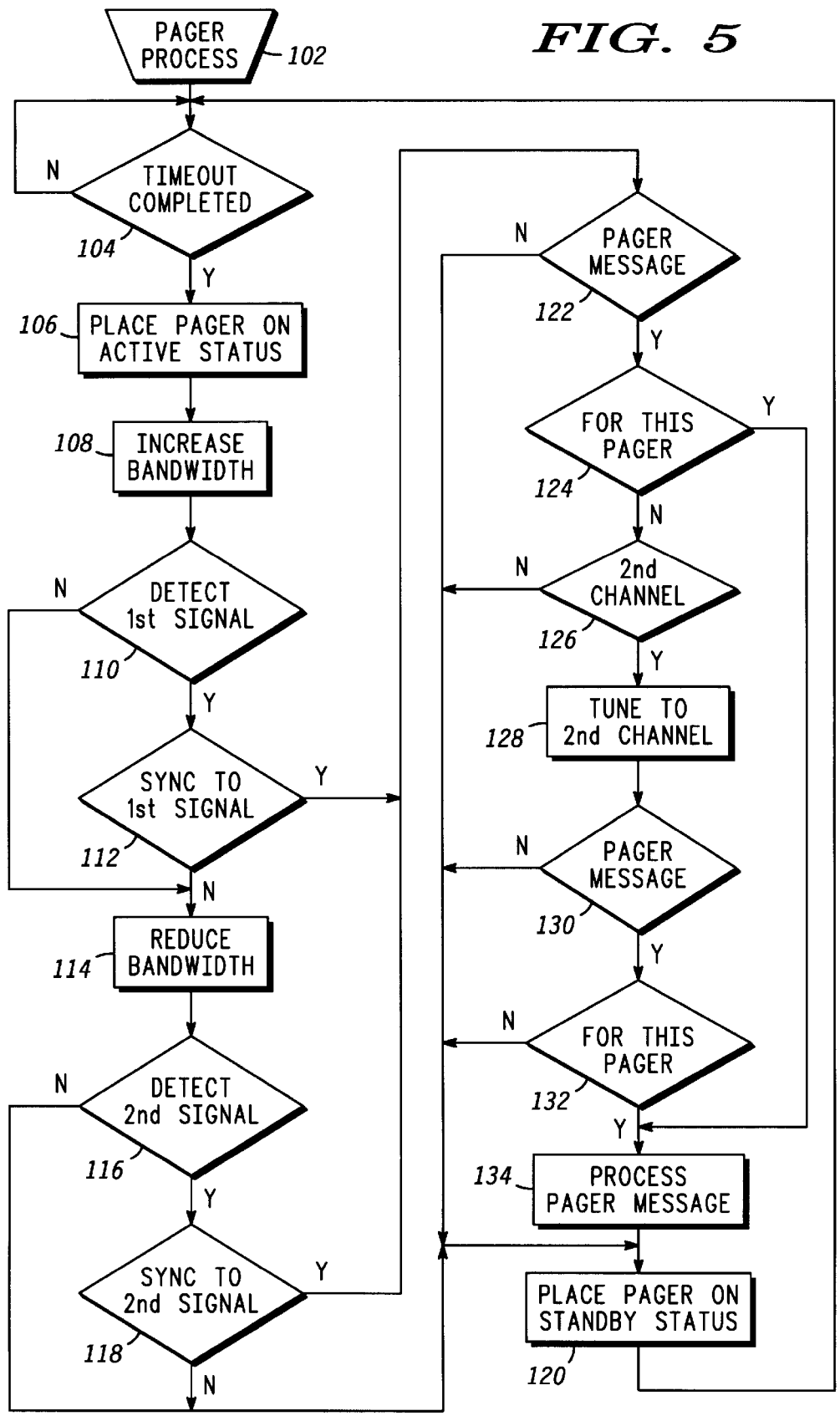
FIG. 5 depicts a flowchart of a multi-channel simplex paging process in accordance with a preferred embodiment of the present invention.

FIG. 5 depicts a flowchart of a multi-channel simplex paging process 102 in accordance with a preferred embodiment of the present invention. The following discussion of process 102 refers to FIGS. 1, 4, and 5.

Process 102 determines how pager 28 may receive a first paging message from a first transmission station or a second paging message from a second transmission station. Within the preferred embodiment, the first transmission station is satellite 24, a moving satellite placed in low-earth orbit 26, and the first paging signal transmitted by satellite 24 is paging signal 30. Likewise, the second transmission station is repeater 22 and the second paging message transmitted by repeater 22 is repeat signal 40.

Those skilled in the art may readily discern that the procedures and concepts utilized in the preferred embodiment readily apply to other configurations and embodiments.

A decision task 104 reiteratively checks the length of time pager 28 has been in a standby mode. As discussed above, pager 28 need only be active for the time of one block 46 (FIG. 2) per superframe 48, i.e. for a period of 21.6 seconds per 194.4 seconds in the given example. Pager 28 is kept in standby mode to extend its battery life.

If decision task 104 determines that pager 28 has been in standby mode for an appropriate period, then a task 106 wakes up pager 28 and places it in an active mode. In the active mode, pager 28 may receive paging message 86 or repeat message 98.

A next task 108 then adjusts the bandwidth of pager 28 to that of paging message reception bandwidth 94. Paging message reception bandwidth 94 is wide enough to allow pager 28 to receive paging message 86 even when maximally shifted upward or downward in frequency due to Doppler effect.

A decision task 110 determines if paging signal 30 is capable of being received. Task 110 attempts to detect paging signal 30 (a first signal) from satellite 24 (a first transmitting station) and, if paging signal 30 is detected, set pager 28 up to receive paging signal 30. If pager 28 is unshadowed and satellite 24 is transmitting paging signal 30, pager 28 will usually detect paging signal 30.

If decision task 110 determines that paging signal 30 is present and has sufficient strength and clarity for good reception, a decision task 112 determines if pager 28 can lock on to and synchronize with paging signal 30.

If decision task 110 was unable to detect paging signal 30 with sufficient strength and clarity for good reception, or if decision task 112 was unable to synchronize with paging signal 30, then a task 114 reduces the reception bandwidth of pager 28 from paging message receiver bandwidth 94 to repeat message receiver bandwidth 100. Receiver bandwidth 94 is adjusted preparatory to attempting to receive repeat signal 40 (a second signal), transmitted by repeater 22.

As discussed above, repeater 22 is essentially stationary relative to pager 28, hence there is insignificant Doppler effect experienced by repeat signal 40. Therefore, repeat signal reception bandwidth 100 need only be as wide as one channel, i.e. 41⅔ KHz, wide enough to receive repeat message 98.

A further benefit of reducing repeat signal reception bandwidth 100 is that, because pager 28 concentrates it reception on 41⅔ KHz repeat channel 80, repeater 22 may transmit at a lower power for the same overall signal-to-noise ration. This lower-power transmission results in a greatly reduced potential interference where multiple repeaters 22 may be used in close proximity, as in adjacent buildings 36.

A decision task 116 determines if repeat signal 40 is capable of being received. Task 116 attempts to detect repeat signal 40 (a second signal) from repeater 22 (a second transmitting station) and, if repeat signal 40 is detected, set pager 28 up to receive repeat signal 40. If pager 28 is within range of repeater 22 and repeater 22 is transmitting repeat signal 40, pager 28 will usually detect repeat signal 40.

If decision task 116 determines that repeat signal 40 is present and has sufficient strength and clarity for good reception, a decision task 118 determines if pager 28 can lock on to and synchronize with paging signal 40.

If decision task 116 was unable to detect repeat signal 40 with sufficient strength and clarity for good reception, or if decision task 118 was unable to synchronize with repeat signal 40, then processing proceeds to a task 120 which places pager 28 into standby mode, after which processing loops back to iterative decision task 104 and begins the standby-mode timeout.

If decision task 112 was able to synchronize with paging signal 30 or decision task 118 was able to synchronize with repeat signal 40, then a decision task 122 determines if paging signal 30 contains paging message 86 in paging channel 74, or if repeat signal 40 contains repeat message 100 in repeat channel 72. If not, processing proceeds to task 120.

If decision task 122 determines that paging signal 30 contains paging message 86 in paging channel 74, or that repeat signal 40 contains repeat message 98 in repeat channel 72, then a decision task 124 discerns if paging message 86 or repeat message 98 is intended for this specific pager 28.

If decision task 124 determines that paging message 86 or repeat message 98 is not intended for this specific pager 28 (e.g., using header information), then a decision task 126 ascertains if alternate paging channel 78 or alternate repeat channel 80 is in use. If not, processing proceeds to task 120.

If decision task 126 ascertains that alternate paging channel 78 or alternate repeat channel 80 is in use, then a task 128 tunes pager 28 to alternate paging channel 78 or alternate repeat channel 80, respectively.

A decision task 130 then determines if alternate paging channel 78 contains paging message 86 or alternate repeat channel 80 contains repeat message 98. If no, processing proceeds to task 120.

If decision task 130 determines that alternate paging channel 78 contains paging message 86, or that alternate repeat channel 80 contains repeat message 98, then a decision task 132 discerns if paging message 86 or repeat message 98 is intended for this specific pager 28. If no, processing proceeds to task 120.

If decision task 124 or decision task 132 determines that paging message 86 or repeat message 98 is intended for this specific pager 28, then a task 134 processes paging message 86 or repeat message 98 in a conventional manner, well known to those skilled in the art. For example, pager 28 would normally alter the user by an audible or vibratory alarm and display an alphanumeric message.

After task 134 has processed the message (either paging message 86 or repeat message 98), decision task 132 has discerned the message is not intended for this specific pager 80, decision task 130 has determined no message was present in the alternate channel (either alternate paging channel 78 or alternate repeat channel 80), decision task 126 has determined the alternate channel is not in use, decision task 122 has determined no message was present in either paging signal 30 or repeat signal 40, decision task 118 has determined pager 28 could not synchronized with repeater signal 40, or decision task 116 could not detect repeat signal 40, then task 120 returns pager 28 to standby mode and processing loops back to decision task 104.

Those skilled in the art will readily discern that the process depicting the operation of pager 28 may vary from that expressed in the preferred embodiment without departing from the concepts and intents expressed therein.

Figure 6:
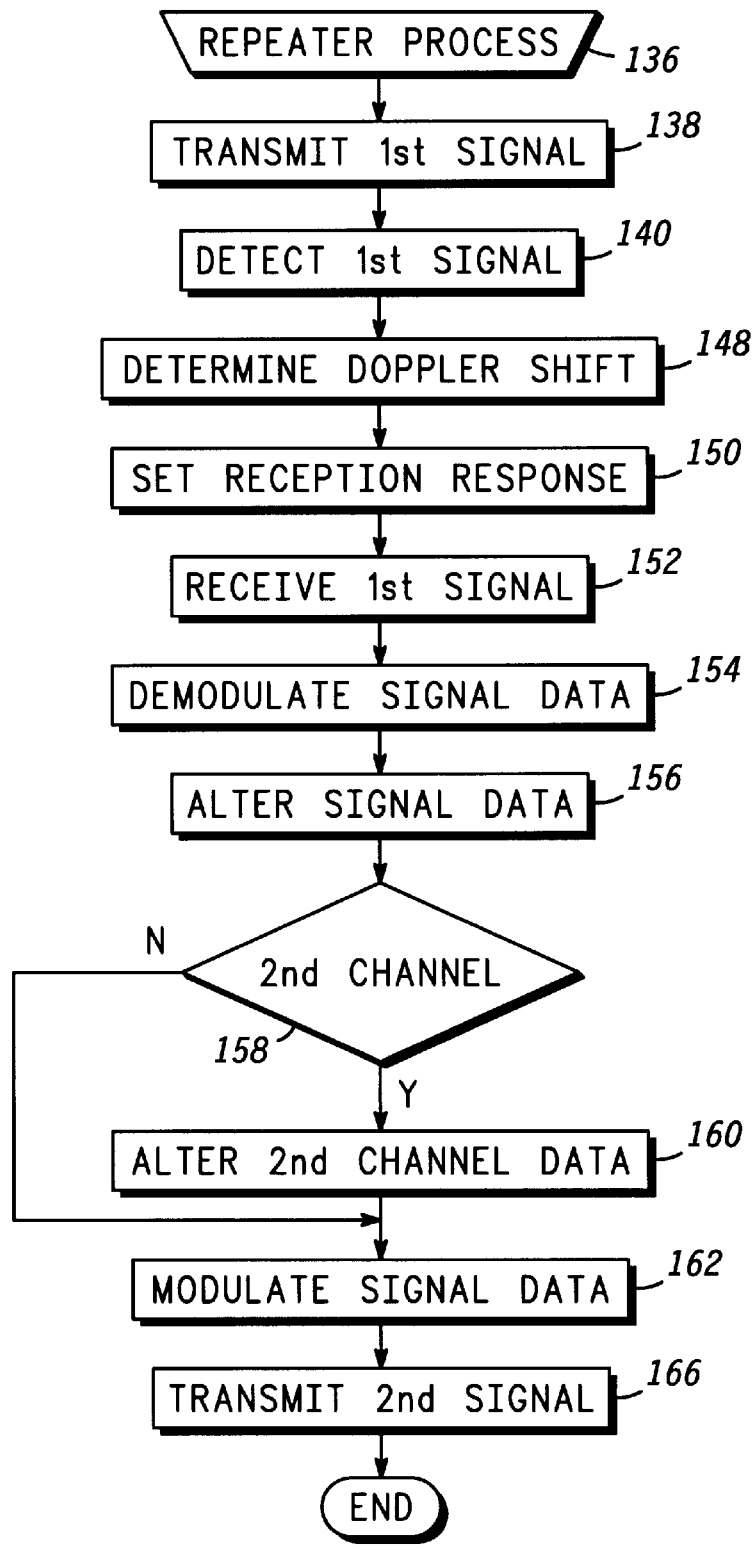
FIG. 6 depicts a flowchart of a multi-channel simplex paging repeater process in accordance with a preferred embodiment of the present invention.

FIG. 6 depicts a flowchart of a multi-channel simplex paging repeater process 136 in accordance with a preferred embodiment of the present invention. The following description of process 136 refers to FIGS. 1, 4, and 6.

Process 136 determines how a second transmission station may receive a first paging signal from a first transmission station, alter that first paging signal as required, and retransmit that first paging signal as a second paging signal for reception by pager 28 when pager 28 is shadowed from direct reception of the first paging signal from the first transmission station.

Within the preferred embodiment, the first transmission station is satellite 24, a moving satellite placed in low-earth orbit 26, and the first paging signal transmitted by satellite 24 is paging signal 30. Likewise, the second transmission station is repeater 22 and the second paging message transmitted by repeater 22 is repeat signal 40.

In a task 138 of process 136, satellite 24 transmits paging signal 30. In the example depicted, paging signal 30 is transmitted during the 20.48 millisecond simplex paging downlink time as a 41⅔ KHz wide signal centered at 1626.0625 MHz within primary paging channel 74, the second channel 66 of exemplary channel allocation scheme 70.

As previously discussed, paging signal 30 is subject to a ±37.5 KHz frequency shift due to the Doppler effect caused by the relative motions of satellite 24 and repeater 22.

In a next task 140, paging signal 30 is intercepted by receiving antenna 34. Receiving antenna 34 is located proximate to building 36 so as to be capable of direct reception of paging signal 30 from satellite 24. Paging signal 30 enters into a receiver 142, and from there to a controller 144. Controller 144 interprets paging signal 30 according to a program stored in a memory 146, and determines the operation of receiver 142.

As previously discussed, paging signal 30 is subject to a potential ±37.5 KHz Doppler frequency shift due to the relative motions of satellite 24 and repeater 22. In order to receive paging message 30 with this potential Doppler shift, repeater 22 has a reception bandwidth 94 of 116⅔ KHz centered on the center frequency of the original channel, 1626.0625 MHz for paging channel 74 in exemplary channel allocation scheme 70. With a reception bandwidth 94 of 116⅔ KHz, repeater 22 may receive paging message 86 without interference only if paging channel 74, the second channel 66 in channel allocation scheme 70, has no information being carried by either adjacent channel 66. The first channel 66 and the third channel 66 should both be unused.

In order to optimize reception of paging signal 30, the bandwidth of receiver 22 should be reduced to 41⅔ KHz centered on the actual, potentially Doppler-shifted, reception frequency of paging signal 30. In a task 148, controller 144 determines the Doppler frequency shift of paging signal 30 based upon actual reception. A task 150 establishes the reception response of repeater 22 by having controller 144 adjust the reception frequency and bandwidth of receiver 142 to that of paging signal 30. That is, as a 41⅔ KHz channel centered on the actual received center frequency of paging signal 30. This allows receiver 142 to receive paging signal 30 in a task 152 with reduced interference and enhanced clarity.

In a task 154, receiver 142 demodulates the primary and/or secondary 41⅔ KHz channels 66 of paging signal 30 to obtain potential messages contained therein. One potential message is paging message 86, normally occupying paging channel 74. In this embodiment, receiver 142 passes the potential messages to controller 144, which stores them in memory 146 in channel-position for further processing.

In a task 156, controller 144 adjusts paging message 86 as required to generate repeat message 98. This includes extracting paging message 86 from paging channel 74, modifying the header 87 of paging message 86 thus altering paging message 86 into repeat message 98, and inserting repeat message 98 into repeat channel 72. This leaves repeat message 86 as an adjusted version of paging message 98, and allows pager 28 to act accordingly upon receipt of either message.

In a decision task 158, controller 144 then ascertains from the stored messages if a message was contained in alternate paging channel 78.

If task 158 ascertains that alternate paging channel 78 does contain a message, then in a task 160, controller 144 alters paging message 86, as in task 156, and assigns the resultant repeat message 98 to alternate repeat channel 80.

In a task 162, controller 144 extracts the stored messages from memory 146 and passes them to a transmitter 164 that modulates the messages to produce repeat signal 40, maintaining channel allocation 70.

In a task 166, transmitter 164 transmits repeat signal 40 through transmission antenna 42. Repeat signal 40 is similar to paging signal 30, save that it is delayed in time (and may also have new header information), typically by the duration of one superframe 48 to allow for the processing of the messages, and save that it contains potential repeat messages 98 in primary repeat channel 72 and alternate repeat channel 80.

Repeat signal 40 may then be received by shadowed pager 28.

In summary, the present invention provides a method of receiving simplex paging signals 30 transmitted by satellites 24 in low earth orbits 26. The relative motion between satellites 24 and essentially earth-stationary pagers 28 and repeaters 22 result in significant Doppler effects. Special expanded reception bandwidth considerations are involved in the direct reception of paging signals 30 by pagers 28 and repeaters 22.

Repeaters 22, unable to simply rebroadcast signals 30 at the same frequencies because of interference problems, transmit repeat signals 40 shifted in both the time and frequency domains. Repeat signals 40 are essentially stationary relative to pagers 28, and hence have no significant Doppler effects.

Pagers 28 are able to determine if the signal being received is paging signal 30 direct from satellite 24, or repeat signal 40 from repeater 22, and adjust their reception bandwidth accordingly.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for repeating a paging message transmitted by a moving paging system base station wherein said paging message is conveyed by a first signal, said first signal being transmitted over a first frequency channel having a predetermined bandwidth, said method comprising the steps of:

9 increasing, by said pager, said reception bandwidth to an amount sufficiently greater than said predetermined bandwidth to contain said first frequency channel when said first frequency channel is shifted in frequency due to a Doppler effect;

reducing, by said pager, said reception bandwidth to an amount substantially equal to said predetermined bandwidth when signal strength of said first signal is insufficient for said pager to receive said first signal;

receiving, by a paging repeater, said first signal from said paging system base station, said paging repeater having a reception bandwidth sufficiently greater than said predetermined bandwidth;

adjusting by said paging repeater, said first signal to compensate for said Doppler effect so as to produce a second signal containing said paging message; and transmitting, by said paging repeater, said second signal containing said paging message over a second frequency channel having substantially said predetermined bandwidth.

2. A method as claimed in claim 1 additionally comprising the step of placing said moving paging system base station in an orbit around the earth.

3. A method as claimed in claim 1 wherein said receiving step additionally comprises the step of establishing said reception bandwidth to contain said first frequency channel, a first guard channel, and a second guard channel.

4. A method as claimed in claim 1 wherein:

up to a maximum downward Doppler shift of said first frequency channel results from a relative divergence of said paging system base station and said paging repeater;

up to a maximum upward Doppler shift of said first frequency channel result from a relative divergence of said paging system base station and said paging repeater;

said receiving step additionally comprises the step of establishing said reception bandwidth to contain said first frequency channel, plus a first guard channel, plus a second guard channel;

said first guard channel is allocated a bandwidth sufficient, when summed with said predetermined bandwidth, to contain said first frequency channel when said first frequency channel experiences said maximum downward Doppler shift; and said second guard channel is allocated a bandwidth sufficient, when summed with said predetermined bandwidth, to contain said first frequency channel when said first frequency channel experiences said maximum upward Doppler shift.

5. A method as claimed in claim 1 wherein said adjusting step comprises the steps of:

demodulating said first signal to obtain said paging message; and modulating said paging message to obtain said second signal.

6. A method as claimed in claim 5 additionally comprising the step of altering said paging message after said demodulation step and prior to said modulation step.

7. A method as claimed in claim 6 wherein said altering step comprises the step of modifying a paging header within said paging message.

8. A method as claimed in claim 5 additionally comprising, after said demodulation step and prior to said modulation step, the steps of:

10 ascertaining from said paging message if said first signal includes an alternate paging channel;

assigning, if said first signal includes said alternate paging channel, data contained in said alternate paging channel to an alternate repeater channel; and altering, if said first signal includes said alternate paging channel, said paging message to indicate the presence of said alternate repeater channel.

9. A method as claimed in claim 1 additionally comprising the step of locating said paging repeater proximate to a building having an interior volume such that a receiving antenna for said paging repeater is in a position to receive said first signal from said paging system base station and a transmitting antenna for said paging repeater is located within said building interior volume.

10. A communication system in which a paging message transmitted by a moving paging system base station is repeated, said paging message being conveyed by a first signal transmitted over a first frequency channel having a predetermined bandwidth, said system comprising:

a paging repeater receiver configured to receive said first signal from said paging system base station, said paging repeater receiver being configured to have a reception bandwidth sufficiently greater than said predetermined bandwidth to contain said first frequency channel when said first frequency channel is shifted in frequency due to a Doppler effect;

a paging repeater controller coupled to said receiver, said paging repeater controller being configured to adjust said first signal to compensate for said Doppler effect so as to produce a second signal containing said paging message;

a paging repeater transmitter coupled to said controller, said paging repeater transmitter being configured to transmit said second signal containing said paging message over a second frequency channel having substantially said predetermined bandwidth; and at least one pager receiver in occasional contact with said paging repeater transmitter, said at least one pager receiver increasing a reception bandwidth to an amount sufficiently greater than said predetermined bandwidth to contain said first frequency channel when said first frequency channel is shifted in frequency due to a Doppler effect;

reducing, by said pager receiver, said reception bandwidth when said first signal is not of sufficient strength for said pager receiver to receive said first signal.

11. A communication system as claimed in claim 10 additionally comprising a satellite in which said moving base station resides, said satellite being in an orbit around the earth.

12. A communication system as claimed in claim 10 wherein:

said paging repeater receiver, controller, and transmitter are located proximate to a building having an interior volume;

said communication system additionally comprises a receiving antenna coupled to said paging repeater receiver, said receiving antenna being positioned to receive said first signal from said paging system base station; and said communication system additionally comprises a transmitting antenna coupled to said paging repeater transmitter, said transmitting antenna being located within said building interior volume.

13. A communication system as claimed in claim 10 wherein said paging repeater receiver is configured to establish said reception bandwidth to contain said first frequency channel, a first guard channel, and a second guard channel.

14. A communication system as claimed in claim 10 wherein said controller is configured to demodulate said first signal to obtain said paging message and to modulate said paging message to obtain said second signal.

15. A communication system as claimed in claim 14 wherein said controller is further configured to alter said paging message.

16. A communication system as claimed in claim 10 wherein:

up to a maximum downward Doppler shift of said first frequency channel results from a relative divergence of said paging system base station and said paging repeater;

up to a maximum upward Doppler shift of said first frequency channel result from a relative divergence of said paging system base station and said paging repeater;

paging repeater receiver is configured to establish said reception bandwidth to contain said first frequency channel, plus a first guard channel, plus a second guard channel;

said first guard channel is allocated a bandwidth sufficient, when summed with said predetermined bandwidth, to contain said first frequency channel when said first frequency channel experiences said maximum downward Doppler shift; and said second guard channel is allocated a bandwidth sufficient, when summed with said predetermined bandwidth, to contain said first frequency channel when said first frequency channel experiences said maximum upward Doppler shift.

17. A method for paging wherein a pager receives a paging message from one of a moving paging system base station and a substantially stationary paging repeater, said method comprising the steps of:

(a) transmitting, at said paging system base station, a first signal containing said paging message over a first frequency channel having a predetermined bandwidth;

(b) receiving, at said paging repeater, said first signal from said paging system base station, said paging repeater having a reception bandwidth sufficiently greater than said predetermined bandwidth to contain said first frequency channel when said first frequency channel is shifted in frequency due to a Doppler effect;

(c) adjusting, at said paging repeater, said first signal to compensate for said Doppler effect so as to produce a second signal containing said paging message;

(d) transmitting, at said paging repeater, said second signal over a second frequency channel having substantially said predetermined bandwidth;

(e) waking up said pager from a standby mode;

(f) adjusting, at said pager after said step (e), a pager reception bandwidth such that said pager reception bandwidth is sufficiently greater than said predetermined bandwidth to contain said first frequency channel when said first frequency channel is shifted in frequency due to said Doppler effect;

(g) receiving, at said pager after said step (f), said first signal from said paging system base station when said first signal is of sufficient strength and clarity for reception at said pager;

(h) reducing, at said pager after said step (g), said pager reception bandwidth, when said first signal from said paging system base station is of insufficient strength or clarity for reception, from said pager reception bandwidth of said step (f);

(i) receiving, at said pager after said step (h), said second signal from said paging repeater when said second signal is of sufficient strength and clarity for reception at said pager; and (j) returning, after said step (i), said pager to said standby mode.

18. A method as claimed in claim 17 additionally comprising the steps of:

determining, at said pager, when said step (g) receives said first signal, if said pager can synchronize with said first signal;

determining, at said pager, when said pager can synchronize with said first signal, if said first signal contains said paging message;

discerning, at said pager, when said first signal contains said paging message, if said paging message is addressed to said pager; and processing, at said pager, said paging message when said paging message is addressed to said pager.

19. A method as claimed in claim 17 additionally comprising, when said second signal in step (i) is of sufficient strength and clarity for reception, the steps of:

determining, at said pager, when said step (i) receives said second signal, if said pager can synchronize with said second signal;

determining, at said pager, when said pager can synchronize with said second signal, if said second signal contains said paging message;

discerning, at said pager, when said second signal contains said paging message, if said paging message is addressed to said pager; and processing, said paging message when said paging message is addressed to said pager.

20. A method as claimed in claim 17 additionally comprising the step of placing said paging system base station in a low-earth orbit around the earth.

* * * * *